Figure 1:
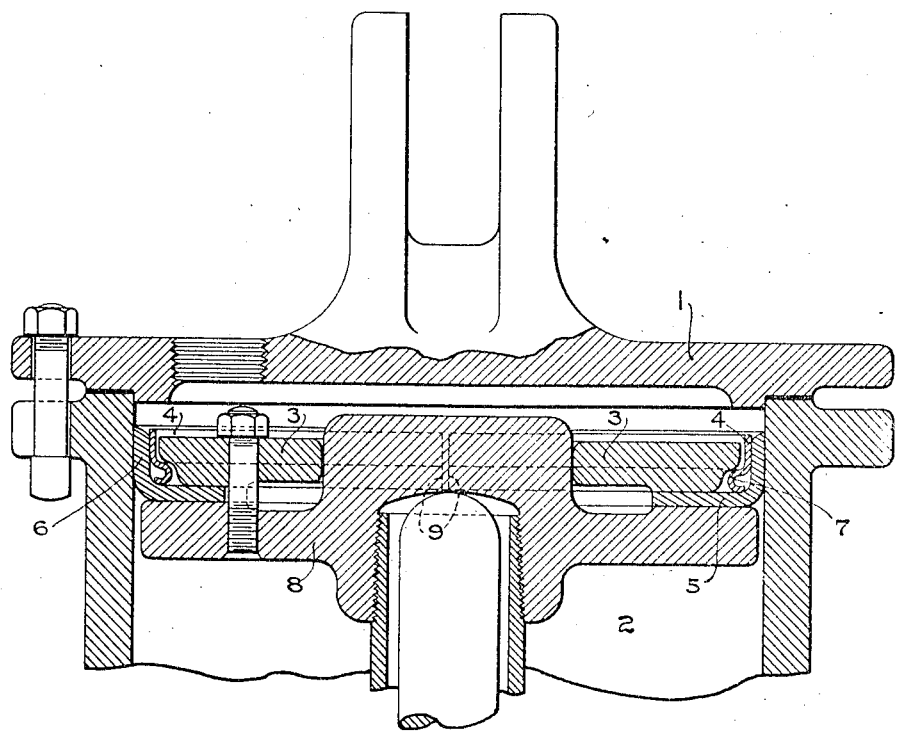

W. H. LIEBER.
PACKING EXPANDER.
APPLICATION FILED FEB. 20, 1911.

1,019,262.

Patented Mar. 5, 1912.

WITNESSES—
Ella Brickell
Nekla Bart

W. H. Lieber INVENTOR—
BY
ATTORNEY.

UNITED STATES PATENT OFFICE.

WILLIAM H. LIEBER, OF MILWAUKEE, WISCONSIN, ASSIGNOR TO ALLIS-CHALMERS COMPANY, OF MILWAUKEE, WISCONSIN, A CORPORATION OF NEW JERSEY.

PACKING-EXPANDER.

1,019,262. Specification of Letters Patent. Patented Mar. 5, 1912.

Application filed February 20, 1911. Serial No. 609,645.

*To all whom it may concern:*

Be it known that I, WILLIAM H. LIEBER, a citizen of the United States, residing at Milwaukee, in the county of Milwaukee and State of Wisconsin, have invented a certain new and useful Improvement in Packing-Expanders, of which the following is a specification.

This invention relates to improvements in the construction of packing expanders particularly adapted to be used for expanding cup leather packings such as are universally used, for instance, in the brake cylinders of air brakes.

The object of the invention is to provide a packing expander which is simple in its construction, efficient in its operation, and which can be easily and cheaply manufactured.

In using packing expanders for expanding cup shaped packings it has been found essential to have the expander coact along the greater part of the cylindrical portion of the packing. Several devices have been devised in which sufficient coaction between the expander and packing is obtained, but these devices have been difficult to manufacture since they require either a special stock or a great amount of machining to produce them.

A feature of the present invention is to form the expander from sheet metal and as much as possible by the use of dies, thereby eliminating to a great extent the constructive difficulties.

For many years, packing expanders for the cup leather packings used in brake cylinders of air brakes, have consisted of a split ring formed of spring wire. This expander coacted with the cup leather packing near the bend thereof and was prevented from moving longitudinally of the cylindrical portion of the cup leather by the piston follower which was provided with an annular recess at its periphery adjacent the bend of the packing, to permit insertion of the expander ring. Thousands of air brake pistons thus constructed have been placed on the market and are at present in service.

In order to provide a sheet metal packing expander which is interchangeable with the old form of spring wire packing expander so that the piston followers now in use may still be utilized, provision must be made for preventing the expander from moving longitudinally of the cylindrical portion of the cup leather due to the large recess formed in the follower and necessary with the old form of expander ring.

It is an object of the present invention to provide a ring which will be locked against longitudinal shifting and which can be freely substituted for the old form of spring wire expander.

A clear conception of several embodiments of the invention may be had by referring to the accompanying drawing in which like reference characters designate the same parts in like or different views, although the invention is not limited to the particular art selected to illustrate same.

Figure 2:
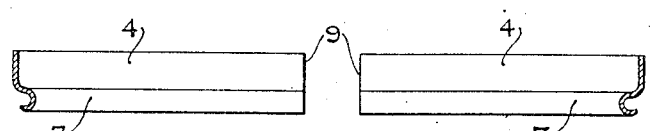
Figure 3:
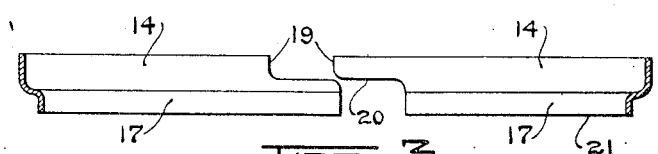

Figure 1 is a fragmentary central vertical section through a brake cylinder, piston and piston packing, showing an expander ring in position. Fig. 2 is a central vertical section through the packing expander ring shown in Fig. 1, the ring being expanded a maximum amount. Fig. 3 is a central vertical section through a modification of the packing expander ring, showing the ring expanded a maximum amount and showing also a modification of the formation of the ends of the ring.

The brake cylinder 2, the end of which is inclosed by the cylinder head 1, is bored to receive the continuous circular or cup shaped packing 5 composed of leather or other suitable material. The cup shaped packing 5 is clamped between the piston body 8 and the piston follower 3, the clamping of the packing 5 being along its flat or plane portion. If it is desired to substitute a continuous cylindrical packing for the cup shaped packing 5 shown, such a substitute packing can be fastened to the periphery of the piston without coaction with the follower 3. The follower 3 has a smaller outside diameter than the interior diameter of the cylindrical portion 6 of the cup shaped packing 5, thus forming an annular space between these members. The portion of the follower 3 adjacent the piston and near the bend of the cup shaped packing 5 is cut away to form an annular groove or recess between the follower and the piston.

The packing expander ring 7, which is preferably formed of sheet metal, has a Z-shaped cross section and is discontinuous at one portion of its periphery along end surfaces 9 formed parallel to the axis of the ring 7. By Z-shaped section is meant any form having two substantially parallel legs with an intermediate connecting portion. The longer leg 4 of the Z forming the cross section of the expander ring 7, is adapted to bear against the inner periphery of the cylindrical or free portion 6 of the packing 5. The remaining portion of the ring extends inwardly from the cylindrical leg 4 and has smaller internal diameters than the outer diameter of the follower 3. The edge of the portion of the ring having least diameter may either be turned outwardly as shown in Fig. 2, or inwardly. When the packing expander ring 7 is inserted between the follower 3 and packing 5, as shown in Fig. 1, the portion of the ring 7 having least diameter abuts with its free edge against the inwardly projecting portion of the packing 5. The portion of the ring 7 having smaller diameter should be formed of axial extent equal to the width of the groove or recess in the follower, thus spanning the annular recess and providing means for preventing axial displacement of the ring 7 on the packing 5. The expander ring 7 is inserted within the piston, while the follower 3 is removed therefrom, by contracting the ring until the adjacent ends 9 nearly meet. The ring while in this contracted condition is inserted within the cylindrical portion 6 of the cup shaped packing 5 until its portion of smallest diameter abuts against the radial portion of the packing 5. The expander ring 7 is then permitted to expand until the leg 4 of the Z coacts against the cylindrical portion 6, thereby expanding same against the cylinder wall.

In the modified form of ring, see Fig. 3, the packing expander ring 17 is also formed with a Z-shaped cross section. The difference between this construction and that disclosed in Fig. 2 is that the portion of the ring having the smaller diameter is not turned outwardly along the edge which normally coacts with the flat portion of the packing. With the ring 17 inserted within a piston the longer leg 14 of the Z section extends into the space formed between the piston and follower and coacts against the inner periphery of the cylindrical or free portion 6 of the packing 5, while the edge 21 of the shorter leg of the Z abuts against the flat portion of the packing 5. The portion of the expander ring 17 of smallest diameter, as in the device disclosed in Figs. 1 and 2, again extends into the recess formed between the follower 3 and piston, thereby preventing axial displacement of the ring 17 upon the packing 5. The expander ring 17 is discontinuous at surfaces 19 which are parallel to the axis of the expander, and at surfaces 20 which are formed at right angles to the axis of the ring. The insertion of the ring 17 within a piston is accomplished in a manner similar to that of inserting the ring 7.

The coaction of the legs 4, 14, of the expanders 7, 17, with the cylindrical or free portion 6 of the continuous circular packing 5, and the outward pressure exerted by the expander upon this cylindrical portion 6 of the packing, tends at all times to keep the packing in coaction with the bore of the cylinder 2, thereby producing a tight joint between the piston and cylinder. Since the fluid pressure is admitted to the interior of the packing 5 only, a further packing of the joint between the reciprocating piston and the cylinder is provided by the fluid pressure acting upon the interior surface of the circular packing 5. If for any reason, the bore of the cylinder 2 is not perfectly true, the outer diameter of the packing 5 will vary at different points of the stroke. In such cases the stepped ends of the expander ring disclosed in Fig 3 would be the more efficient since they lap each other and thus tend to prevent bunching of the adjacent packing.

The rings can be formed either by spinning, rolling or with the use of dies, the latter method however being preferred. I forming the expander ring with the use of dies, a strip of sheet metal of the correct length is rolled into the form of a discontinuous cylindrical ring of the proper diameter. The ring thus formed is inserted on a stationary die having diameters corresponding to the inner diameters of the finished expander and also having a slot which receives the longer leg 4, 14, of the ring. The outer movable die, which may be either continuous or sectional and has internal diameters corresponding to the external diameters of the portions of the expander ring of smaller diameter, is then forced again the ring portion which projects from the slot in the stationary die, pressing same in either of the forms illustrated.

The modified form of ring would probably be easier to form by means of dies than the form of ring shown in Fig. 2, although the additional area of cross section of ring shown in Fig. 2 would tend to give the ring a greater degree of stiffness. It should also be noted that either of the forms of rings disclosed could be readily substituted for the old form of wire expander, the sheet metal ring being more efficient as well as being locked against longitudinal shifting the ring on the packing.

It should be understood that it is not desired to be limited to the exact details construction shown and described, for o ous modifications will occur to a person skilled in the art.

It is claimed and desired to secure by Letters Patent,—

1. In combination with a continuous circular packing having a cylindrical portion adapted to bear against the cylinder wall, a sheet-metal expander ring for said packing, said ring having a cylindrical portion adapted to bear directly against said cylindrical portion of said packing, a second cylindrical portion of smaller diameter than said first mentioned portion, and a plane portion connecting said cylindrical portions of said ring.

2. In combination with a continuous circular packing having a cylindrical portion adapted to bear against the cylinder wall, a sheet-metal expander ring for said packing, said ring having a cylindrical portion adapted to bear directly against said cylindrical portion of said packing, a second portion of smaller diameter than said first portion adapted to coact against another portion of said packing, and a third portion connecting said portions of said ring.

3. In combination with a continuous circular packing having a cylindrical portion adapted to bear against the cylinder wall and a plane portion extending inwardly from said cylindrical portion, an expander ring for said packing, said ring having a cylindrical portion adapted to bear directly against a major portion of said cylindrical portion of said packing, a second cylindrical ring portion free from engagement with the cylindrical portion of said packing and coacting with said plane portion of said packing, and a third portion of said ring connecting said cylindrical ring portions.

4. In combination, a piston, a follower adjacent said piston, said piston and follower having a circular recess formed between them, a circular packing extending axially from said piston and adjacent said follower, and a packing expander ring having a plurality of circular portions and a substantially plane portion connecting said circular portions, one of said circular portions coacting directly with said circular packing and extending between said packing and follower, another of said circular ring portions spanning said recess, and the plane portion of said ring coacting directly with said follower.

5. In combination, a piston, a follower adjacent said piston, said piston and follower having a circular recess formed between them, a circular packing extending axially from said piston and adjacent said follower, and a packing expander ring having a plurality of circular portions and a connecting portion for said circular portions, one of said circular ring portions extending between said follower and said packing and bearing directly against said packing, another of said circular ring portions spanning said recess, and the connecting portion of said ring coacting directly with said follower.

In testimony whereof, I affix my signature in the presence of two witnesses.

WILLIAM H. LIEBER.

Witnesses:
CHAS. L. BYRON,
ROB. E. STOLL.